United States Patent [19]

Birch et al.

[11] Patent Number: 5,519,845

[45] Date of Patent: May 21, 1996

[54] METHOD AND SYSTEM FOR STORAGE AND RETRIEVAL OF ITERATIVE DATA ASSOCIATED WITH AN ITERATIVE PROCESS WITHIN A CACHE

[75] Inventors: Rodney Birch; Keith Holmes, both of Dublin, Ireland

[73] Assignee: International Business Machines Corporation, Armonk, N.Y.

[21] Appl. No.: 160,019

[22] Filed: Dec. 1, 1993

[30] Foreign Application Priority Data

Dec. 2, 1992 [GB] United Kingdom .................. 9225209

[51] Int. Cl.$^6$ ............................................ G06F 12/08
[52] U.S. Cl. .................. 395/445; 395/403; 364/DIG. 1; 364/243.41; 364/256.4
[58] Field of Search .......................... 364/200 MS File, 364/900 MS File; 395/400, 425

[56] References Cited

U.S. PATENT DOCUMENTS

| | | | |
|---|---|---|---|
| 4,426,682 | 1/1984 | Riffe et al. | 395/425 |
| 4,633,387 | 12/1986 | Hartung et al. | 395/650 |
| 4,885,680 | 12/1989 | Anthony et al. | 395/425 |
| 5,018,061 | 5/1991 | Kishigami et al. | 395/400 |
| 5,133,061 | 7/1992 | Melton et al. | 395/425 |
| 5,155,824 | 10/1992 | Edenfield et al. | 395/425 |
| 5,165,028 | 11/1992 | Zulian | 395/400 |
| 5,195,096 | 3/1993 | Moore | 371/21.1 |
| 5,226,133 | 7/1993 | Taylor et al. | 395/400 |
| 5,226,146 | 7/1993 | Milia et al. | 395/425 |
| 5,247,653 | 9/1993 | Hung | 395/500 |
| 5,353,430 | 10/1994 | Lautzenheiser | 395/425 |
| 5,357,623 | 10/1994 | Megory-Cohen | 395/425 |
| 5,367,653 | 11/1994 | Coyle et al. | 395/400 |

*Primary Examiner*—Matthew M. Kim
*Attorney, Agent, or Firm*—Mark E. McBurney; Richard A. Henkler

[57] ABSTRACT

An improved method and system for storing iterative data associated with an iterative process within a cache. A first iteration of an iterative process, having a plurality of steps, is executed. During the execution of each one of the plurality of steps, iterative data associated with each one of the plurality of steps is stored within the cache, and identified with the appropriate one of the plurality of steps. During the execution of a second iteration of the iterative process, iterative data generated by one of the plurality of steps is compared with the stored iterative data from the first iteration which is identified with the one of the plurality of steps. If the identified iterative data matches the generated iterative data then a method address stored within the identified iterative data is used to retrieve the method from main memory and execute it without using a standard look up table.

6 Claims, 2 Drawing Sheets

METHOD AND SYSTEM FOR STORAGE AND RETRIEVAL OF ITERATIVE DATA ASSOCIATED WITH AN ITERATIVE PROCESS WITHIN A CACHE

This application claims foreign priority benefits under 35 U.S.C. § 119 of Ser. No. 9225209/7 filed on 02/12/92 in the United Kingdom.

BACKGROUND OF THE INVENTION

This invention relates to the field of data retrieval, and in particular data retrieval using an intermediate storage mechanism, such as a cache, within a data processing system capable of performing iterative processes.

Modern data processing systems need to be able to access data very quickly if they are to operate at the speeds dictated by many of today's applications. As the amount of data being stored has increased, much research has been carried out in order to find quicker methods of accessing such data. It has been found that in many applications an intermediate store mechanism, called a 'cache', can provide a very effective means for decreasing the amount of time associated with accessing data.

U.S. Pat. No. 4,426,682 describes a data processing system which employs a cache memory to reduce reference to main memory and hence expedite processing execution. The problem which it seeks to overcome is that the data stored in the cache is subject to frequent modification either by the same or by a different user process. Hence the data in the cache for one process may be invalid for another user process. The patent describes an improved technique for flushing the cache whereby all present data in the cache is made invalid without having to reset each memory location in the cache, hence saving processing time. This patent is illustrative of the general desire to reduce processing time expended in retrieving data whenever possible.

A large amount of research into caching techniques has resulted in various different types of caches being developed, one popular type being the 'least recently used' (LRU) type of cache. A typical data processing system will include a large main memory in addition to such a cache, the cache typically being much smaller than the main memory. When a particular process requires a piece of data a search of the cache is initially made to see if that data is already in the cache. Due to the relative sizes, it is much quicker to search through the cache than to search through main memory. Only if the data is not in the cache is the data retrieved from main memory. Since this is a comparatively lengthy procedure the data is copied into the cache in case it is needed again. If the cache is already full then a particular piece of data will need to be erased from the cache to make room for the new data. In a LRU type of cache the piece of data erased from the cache will be that data which has been used least recently.

It has been found that the same piece of information is often used many times in succession, and indeed that some very lengthy programs often only need to access a small number of data entries. In such situations a cache such as described above can make a large difference in the speed of operation since it is much quicker for the system to look in a small cache for a piece of information rather than searching through a large data base.

One particular environment where caches have been put to good use is the message based environment employed by Object Orientated Programming (OOP) techniques. OOP is a particular approach to software development which implements required functions by way of 'messages' sent to 'objects'. Caching can be particularly valuable for small tight loops with a small number of messages cached.

An 'object' is a software package that contains a collection of related procedures (hereafter called 'methods') and data (hereafter referred to as 'variables'). Further objects can be grouped into 'Object Classes'. An Object Class is a template for defining the methods and variables for a particular type of object. All objects of a given class are identical in form and behavior but contain different data in their variables.

A 'message' is a signal sent from one object to another to request the receiving object to carry out one of its methods. Hence a message sent to an object will cause a method to be invoked to implement the required function.

There are two particular ways in which messages can be resolved into invoked functions, that is either at compile time or at run time. There is a trade off between performance and flexibility depending on the choice taken. If messages are resolved at compile time they will be turned into a function call by the compiler and will hence perform well. However in order for this to take place the type of the object and the message must be known at compile time. If the messages are resolved at run time, then the message and object are used to look in some internal tables in order to determine which function to call. This latter approach to function resolution is known in the art as 'late' or 'dynamic' binding.

Dynamic binding is a much more flexible approach to function resolution than the 'compile time' approach, because it reduces the dependencies between code 'modules'. Code modules are components of programs, each of which contains its own procedures and data; generally the different modules of a program are kept as independent as possible from each other. With dynamic binding, if an object type used by one module is changed this will not require all connected modules to be recompiled, since the function resolution does not take place until run-time. However dynamic binding is detrimental to overall performance since the table lookup adds a significant overhead to every function call. It is generally considered to be a very slow form of function resolution, and this becomes particularly apparent when an iterative process is taking place. Programming logic frequently dictates that loops are used where a process is repeated multiple times until a particular condition is met.

It is known for OOP systems to include optimization techniques in an attempt to reduce the table lookup times when a message is sent to an object. One such technique involves the use of a HASHING algorithm, while an alternative approach is to cache the last 'n' messages that are sent to objects of a particular object class.

Both of these techniques are valuable but have a cost/benefit trade off. HASHING is well known in the art and so will not be discussed further here. As an illustration of the caching approach consider the situation in which the last five messages sent to objects of a particular object class are cached. If a different message is then sent, five incorrect entries in the cache need to be checked before a table lookup is initiated. Obviously as the number of messages cached increases so does the overhead involved in checking incorrect entries, until a point is reached where the cache is the same size as the original table, at which point no benefit is gained. On the other hand if the cache size is decreased the chance of achieving a successful match of a particular message with one already stored decreases, which also reduces the benefit. Further, caching could be performed on the last 'n' messages regardless of class. Again a judgement on trade-off needs to be made to decide on a suitable cache size. The problem of trying to find a suitable cache size and method of operating the cache is the subject of numerous papers. In some cases the introduction of a poor cache size and/or operating method can reduce performance over an equivalent system having no caching.

SUMMARY OF THE INVENTION

It is an object of the present invention to provide a data processing system having a cache in which the speed of data retrieval is increased, particularly when used in an environment as illustrated by dynamic binding in OOP applications where iterative processes occur.

Accordingly, in contrast to the prior art, the present invention provides a data processing system including a cache, a main memory, and a processor, wherein iterative processes are performed by the processor. The present invention includes writing means for retrieving data from the main memory and storing the data within the cache as a sequence of entries and reading means for addressing a particular entry. The reading means further include a detector programmed to detect the start and end of an iterative process and a controller, responsive to said detector, for controlling the cache and an indexing mechanism, wherein the controller initializes the cache and sets the indexing device when the detector indicates the start of a new iterative process. The indexing mechanism is responsive to requests by the processor for data during the first iteration of the new iterative process, and informs the writing means where to store the data in the cache. Additionally, the indexing mechanism further controls the reading means during subsequent iterations of the iterative process so that the reading means accesses the cache at the appropriate entry for the data required.

Viewed from a second aspect, the present invention provides a method of operating a data processing system including a cache, a main memory, and a processor, wherein iterative processes are performed by the processor. This method includes retrieving data from the main memory and storing the data within the cache as a sequence of entries and addressing a particular entry. The step of addressing includes detecting the start of a new iterative process, initializing the cache and responding to requests by said processor for data during the first iteration of the new iterative process. The step of addressing also controls the storing of the data in the cache as carried out in the previous step of storing. The method of the present invention then detects the end of the new iterative process and controls the addressing step during subsequent iterations of the iterative process so that the cache is accessed at the appropriate entry for the data required.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

The present invention will be described further, by way of example only, with reference to an embodiment thereof as illustrated in the accompanying drawings, in which.

DETAILED DESCRIPTION OF THE PREFERRED EMBODIMENTS

Figure 1:
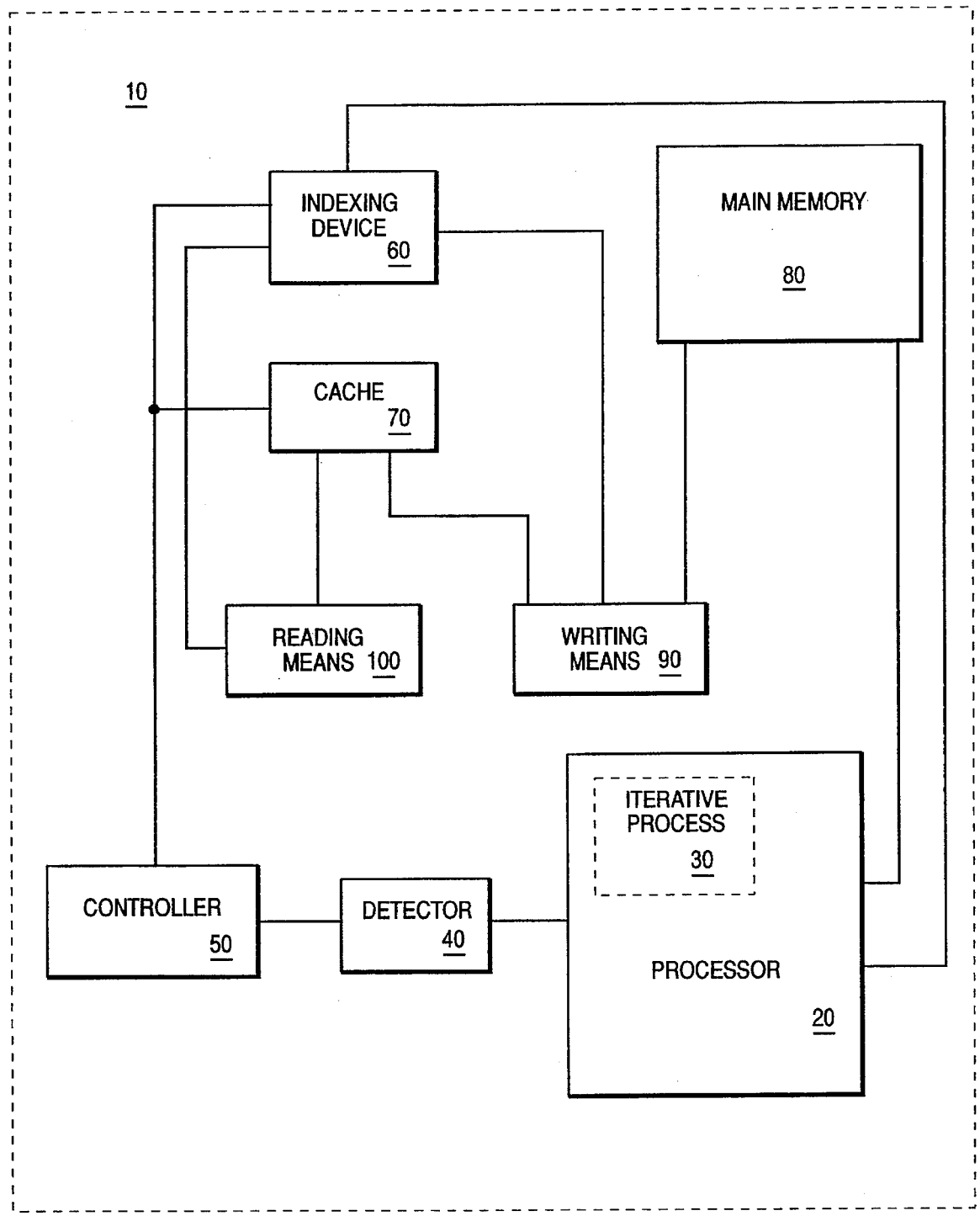
FIG. 1 is a block diagram showing a data processing system in accordance with a preferred embodiment of the present invention.

FIG. 1 shows a data processing system 10 in accordance with the preferred embodiment of the present invention. A processor 20 within the system is used to run software applications, which may involve the performance of iterative processes 30. A detector 40 is provided within the system 10 to detect the start and end of new iterative processes being performed within the processor 20. This detector can take several forms but in preferred embodiments the programmer knows when a loop will start and so provides pieces of code within the main body of code which indicate the start of a loop.

When the detector detects the start of a new loop it informs the controller 50, which initializes a cache 70 and resets the indexing mechanism 60 to zero. The manner in which the cache is initialized in the preferred embodiment will be discussed later.

Once the iterative process is started, the indexing device 60 is responsive to requests by the processor 20 for particular methods. When such a request is made the indexing device 60 will cause the writing means 90 to look up the method in the main memory 80. Further it will instruct the writing means to store the address of that method within the cache 70 at a location identified by the indexing device. This location is selected based on the number currently held in a counter within the indexing device 60. The indexing device 60 will then increment the counter so that the next method address retrieved by the writing means 90 is stored in a different location of the cache. This procedure will be repeated each time the processor requests a method during the first iteration of the loop, and so the cache grows in size (by creating a plurality of sequential entries) until the end of the loop is identified by the detector 40. The controller 50 utilizes indexing device 60 to relate the plurality of sequential cache entries to corresponding steps in the iterative process.

When the detector 40 detects the end of the loop it informs the controller 50 which then resets the indexing device 60. The detector may recognize the end of a loop in a number of different ways. Firstly, the length of the loop may be specified in the code by a 'maximum cache size' parameter indicating the maximum number of entries to be placed in the cache. Once the counter in the indexing device has reached this number the writing process is terminated and the indexing device 60 is reset. Alternatively, the detector may compare the elements of each method request with the equivalent elements in the first method request of the loop. In the preferred embodiment these elements will include the message sent and the receiving object type. When the elements match, the detector 40 will assume that the first loop of the iterative process has been completed.

During a subsequent iteration of the loop the receiving object type and the message sent are compared by the processor 20 with the equivalent elements stored at the cache entry identified by the current counter value in the indexing device 60. These elements are retrieved from the cache by the reading means 100 under the control of the indexing device 60.

If these elements match, then the message address stored with these elements in the cache 70 is retrieved from the cache 20 by the reading means 100 and used by the processor to locate the method directly from main memory 80. The indexing device 60 then increments its counter by one so that the next cache entry will be used for the next comparison. If however the elements do not match, then a direct lookup procedure in main memory 80 is used to find the method address.

Such an approach has the advantage that, once the cache is prepared during the first iteration, only one comparison is used to determine whether the stored information in the cache is used. This leads to large improvements in system performance.

Figure 2:
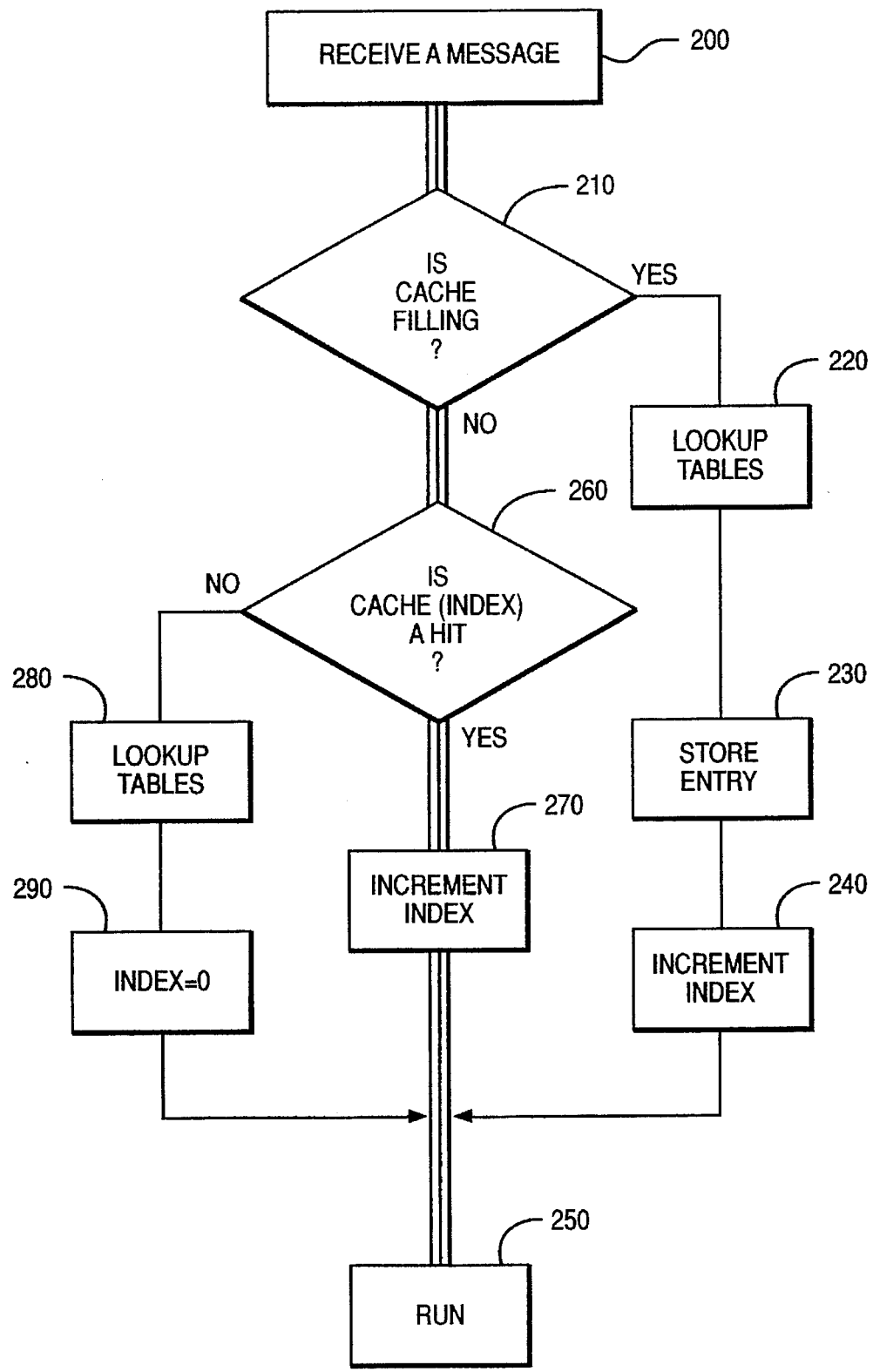
FIG. 2 is a flow diagram illustrating how the cache within the data processing system is managed in the preferred embodiment of the present invention.

Having described the system of the preferred embodiment the management of the cache will now be described in more detail with reference to FIG. 2. FIG. 2 is a simplified flow diagram showing the main steps carried out by the data processing system of the preferred embodiment when messages are sent to object classes in an OOP iterative process. At step 200 a message is received by a particular object, instructing it to run a particular method for that object class.

Then at step 210 the processor 20 determines whether the cache 70 is in the process of being filled by the writing means 90. If it is, then the indexing device 60 instructs the writing means 90 to lookup the particular method from the tables in main memory 80; this process is indicated at step 220 in FIG. 2.

Once the particular method has been located, the writing device 90, at step 230, stores the method address in an entry of the cache 70 under the control of the indexing device 60. At step 240 the counter in the indexing device 60 is incremented, and at step 250 the particular method is run.

If at step 210 it was determined that the cache was not filling, a comparison is made between the present method request and the elements stored at the cache location currently indicated by the counter in the indexing device 60. As discussed earlier this comparison involves comparing the 'receiving object type' and the 'message sent' sent by the processor 20 with the equivalent elements stored at the current cache entry. This comparison is indicated in FIG. 2 by step 260 where it is determined whether the cache entry at the present index of the counter is a hit.

If the cache entry does match with the current method request, i.e. there is a hit, then the index in the counter is incremented (step 270) and the method indicated by the address in the cache entry is retrieved from memory and run (step 250).

If however, at step 260, the elements in the current cache entry do not match those elements of the current method request from the processor 20, then direct look up of the main memory 80 is performed at step 280 to find the method in question, the index in the counter of the indexing device 60 is reset (step 290), and the method is run at step 250.

FIG. 2 is simplified in some respects. It assumes that the cache is initialized already, and that caching has been selected. Further, for the purposes of clarity, 'boundary checking' routines are not shown in FIG. 2. In particular the cache filling step 210 does not show 'CACHE FILLED'; this condition would arise if either the end of the loop had been detected by the detector 40 or the maximum cache size had been reached. Also the INCREMENT INDEX steps 240, 270 do not show any of the logic relating to the box, e.g. "if index=CACHE SIZE: index=φ".

Having discussed FIG. 2, a particular example will now be considered. Most loops follow a definite pattern where the order of messages sent on each iteration is the same. Consider the following log of the messages sent to create and initialize a customer object:

| Receiving object type | Message sent |
| --- | --- |
| CustomerClass | new |
| customer | setUniqueID |
| customer | setFirstName |
| customer | setSecondName |
| customer | setHouseAddress |
| customer | setStreetAddress |
| customer | setCityAddress |

This log could be generated from the following pseudocode:

```
CASE : CUST-LIST /* Fill Customer List */
    SEND INIT_CACHE(TRUE) /*Tell the cache to start*/
    while ( i++ < NUM_CUSTS )
        SEND NEW(i)
    return
CASE : NEW(i)
    SEND SetUniqueID(i)
    SEND SetFirstName(i)
    SEND SetSecondName(i)
    ...... etc.
```

In a typical situation, the set of messages sent to object types would be the same each time an operation is repeated. In the above scenario where a list of customers is to be created (using information from a database, for example) then there would be a loop where the above set of messages would be repeated—once for each set of customer data.

In the preferred embodiment of the present invention, the messages and object types are cached using the following steps.

1) The beginning of a loop is identified. As mentioned earlier, if the programmer knows when a loop is starting he can indicate to the lookup logic to initiate a cache starting with a particular message. This allows the logic to separate loop iterations. A counter (hereafter referred to as a 'Loop Index') to track the number of messages sent since the start of the loop is initialized at the beginning of each iteration and incremented every time a message is sent.

2) On the first iteration a cache table is initialized with the following information: Loop Index, Receiving Object Type, Message Sent, Method Address. The method address is found by a normal table lookup procedure based on the receiving object type and the message sent. After the first iteration of a loop creating and initializing a list of customers the cache table would be as follows:

| Loop Index | Rec. object type | Mess. sent | Method Addr. |
| --- | --- | --- | --- |
| 0 | CustomerClass | new | ...... |
| 1 | customer | setUniqueID | ...... |
| 2 | customer | setFirstName | ...... |
| 3 | customer | setSecondName | ...... |
| 4 | customer | setHouseAddress | ...... |
| 5 | customer | setStreetAddress | ...... |
| 6 | customer | setCityAddress | ...... |

("......" represents a method address in main memory 80)

3) On the second and subsequent iterations, the receiving object type and the message sent are compared with the values stored at the current loop index. If they match then no search is necessary, the method address is immediately available. If the values do not match then a normal direct lookup is used to resolve the method address.

As will be readily apparent, once the cache table is initialized and created, only one comparison is used to determine whether the stored information in the cache can be used. In large loops this is critical because the search results are stored for many messages but only the most likely one is used. For instance, in a loop of 100 messages per iteration the last 100 messages sent must be stored to hold the search results for the loop. In a standard cache, all 100 stored messages must be compared before a hit or miss is decided. This may be comparable with or worse than the standard table search. With the above described technique only one comparison is necessary, since the cache can be made to follow the behavior of a loop under conditions of a repetitive process and achieve a 100 percent 'hit rate' with only a single lookup. This is achieved by using a simple index into the cache which is moved by the process.

A simple example of a non-cached data retrieval process in an OOP environment can be illustrated as follows:

```
{
    function = LOOKUP (message, class);
    return (run (function));
}
``` where LOOKUP is relatively expensive.

The LOOKUP command results in main memory being searched for the method function which matches the message and class. This message function is then run and its value is returned.

In contrast, the cached process of the preferred embodiment of the present invention can be illustrated as:

```
{
static CacheTable = AllocateCacheTable
( MAX_CACHE_ROWS);
static Index;
if message = INIT_CACHE{
        Index = 0;
        if parm = TRUE{
            CacheON = TRUE;
            /* can have other parms - see variations */
        }
        else
            CacheON = FALSE;
}
if CacheOn = TRUE { /* if Caching */
        if message = CacheTable ( index++) —> message /* if a 'hit' */
            return run (CacheTable(index -1)—>function) /* run the function */
        else        /* not a 'hit'    */
            if CacheTable(index)—> message == EMPTY { /* table not populated */
                function = LOOKUP (message, class)
                CacheTable(index )—> message = MESSAGE /* populate it */
                CacheTable(index ++)—> function = function
                return run ( function)
            }
            else
                index=0;    /* see asynchronous messages */
}
return(run( LOOKUP (message, class))) /* Cache was not on or failed */
}
```

The above implementation excludes some details for clarity—e.g. if the process fails to get a 'hit' it should reset to 0 and check to see if it has a match at 0, i.e. the loop is restarting so it should not keep filling the cache table.

The above described preferred embodiment of the present invention is extremely useful and provides a large performance improvement for any system which implements repeated loops. However, as will be apparent to a person skilled in the art, the programmer may have access to information which could be used to modify the caching under specific conditions. These modifications could be initialized at INIT_CACHE. Several such modifications are discussed below:

1) Asynchronous Messaging

Asynchronous messaging is a technique in which a message to be processed is stored for processing at a later stage when a current task has been completed.

Asynchronous messaging requires that any failure to match the cached entry should result in the index being reset.

A loop may be encoded using asynchronous messaging, as in IBM OS/2 Presentation Manager using WinPostMsg (OS/2 and Presentation Manager are trademarks of International Business Machines Corporation). WinPostMsg is a function accessible to people writing applications for Presentation Manager which enables asynchronous messaging to take place. Such encoding can allow other messages to be processed while the loop is still executing. Consider the following extract of pseudo code:

```
CASE : NEW (loop-value)
    IF loop-value >= MAX_LOOP
        POST FINISHED
    SEND Set UniqueID (loop-value)
    SEND Set Name (loop-value)
    SEND Set Address (loop-value)
    POST NEW (loop-value + 1 )
Break;
```

POST is a function used to allow messages to be handled asynchronously. Here the cache would contain the same customer information as discussed earlier, namely:

| Loop Index | Rec. object type | Mess. sent | Method Addr |
|---|---|---|---|
| 0 | CustomerClass | new | ..... |
| 1 | customer | setUniqueID | ..... |
| 2 | customer | setFirstName | ..... |
| 3 | customer | setSecondName | ..... |
| 4 | customer | setHouseAddress | ..... |
| 5 | customer | setStreetAddress | ..... |
| 6 | customer | setCityAddress | ..... |

Although this may be interrupted to process another message in the queue the caching will remain active.

2) Repeated Messages within Loops

For loops which repeat the original message within themselves, the programmer could give a CACHE SIZE parameter to indicate that the next number of messages should be cached regardless of any repetition. This means that the cache need not check while it is populating the table whether the current entry matches the first entry or not. Consider the following illustration:

DO GET

DO EVEN

DO GET

DO ODD

If the programmer sets the CACHE_SIZE parameter to four then the repetition of 'DO GET' causes no problems. Otherwise the cache would have a length of two, and so would only give a 75 percent hit rate.

3) Imperfect Loops

The following sequence may not fit well into the above described general scenario:

```
while ( i++ < iMax ) {
    SEND SetUniqueID
}
and SetUniqueID is:
    while ( j++ < MAX_CHARS) {
        SEND get_next_char
    }
```

If the system starts caching at SetUniqueID the size of the cache table would be MAX_CHARS by the time only two messages have been sent. In this situation a tiered (hierarchical) approach can be used, where the index is incremented by the depth of the nested procedure call. SetUniqueID would be cached at recursion level 1 and get_next_char at level 2. This gives a cache size equal to the maximum level of recursion. Again this would give a 100 percent hit rate with only a very small cache size.

It would be unusual to have this sort of perfect structure for such nested procedure calls. For example, SetUniqueID may send messages which in turn may send messages, and so on. However, there is no restriction on the type or size of the cache at each level of recursion. Any caching method can be used at any level, whether it is of the last-n type or the indexed cache described above.

This technique is extremely useful and advantageous in heavily recursive systems because the cache size at each level is effectively multiplied by the number of recursion levels, e.g. if five levels of recursion are used and four messages are cached at each, then 20 (=5×4) messages are actually cached. However only four are used for each cache search. The programmer can decide the type of caching required using a parameter indicating what mix of caching to use.

Any combination of the above could be used to make the filling of the cache completely adjustable by the programmer. INIT_CACHE could be defined so that a nested CACHE of depth 10 is used with a standard cache of size two when at nested depth 4. Within this an indexed cache could be used by sending another INIT_CACHE to dynamically allocate a new cache table, etc.

Although certain preferred embodiments have been shown and described, it should be understood that many changes and modifications may be made therein without departing from the scope of the appended claims.

We claim:

1. A data processing system for storage and retrieval of iterative data generated from an iterative process executing therein, said iterative process having a plurality of steps, said data processing system comprising:

means for storing, during a first iteration of said iterative process, iterative data for each one of said plurality of steps in a cache, said iterative data including a message, object type and method address;

means for indexing said stored iterative data, said indexing means including:
a counter; and
means for incrementing said counter during execution of each one of said plurality of steps;

means for detecting when each iteration of the iterative process has finished executing, said means for detecting including:
means for resetting a first step in said iteration of said iterative process to a value corresponding to said first step;

means for comparing, during a subsequent iteration of said iterative process, iterative data generated from one of said plurality of steps with said stored iterative data related with said one of said plurality of steps to determine if said related message and object type matches said generated message and object type; and means for retrieving execution data from memory when said related message and object type and said generated message and object type match.

2. A data processing system for storage and retrieval of iterative data generated from an iterative process executing therein, said iterative process having a plurality of steps, said data processing system comprising:

means for storing, during a first iterative of said iterative process, iterative data for each one of said plurality of steps in a cache, said iterative data including a message, object type and method address;

means for indexing said stored iterative data, said indexing means including:
a counter; and
means for incrementing said counter during execution of each one of said plurality of steps;

means for detecting when each iteration of the iterative process has finished executing, said means for detecting including:
means for resetting a first step in said iteration of said iterative process to a value corresponding to said first step;

means for comparing, during a subsequent iteration of said iterative process, iterative data generated from one of said plurality of steps with said stored iterative data related with said one of said plurality of steps to determine if said related message and object type matches said generated message and object type; and means for retrieving a method stored in said memory using said method address of said related iterative data when said related message and object type and said generated message and object type match.

3. A method of storing iterative data in a data processing system having a cache and memory, said method comprising the steps of:

executing a first iteration of an iterative process having a plurality of iterative stages, each one of said plurality of iterative stages generating a set of iterative data having a receiving object type, a message sent, and a method address;

storing each one of said generated sets of iterative data in said cache;

identifying each one of said stored sets of iterative data with its corresponding one of said plurality of iterative stages;

executing a second iteration of said iterative process;

comparing, during said second iteration, a new set of iterative data generated from said first stage of said plurality of iterative stages with said stored set of iterative data identified with said first stage;

determining that said first iteration has finished executing by verifying that said identified stored set of iterative data matches said generated set of iterative data;

comparing, during said second iteration, a new set of iterative data generated from one of said plurality of iterative stages with one of said stored sets of iterative data identified with said one of said plurality of iterative stages to determine if said identified stored set of iterative data matches said new set of iterative data; and retrieving from said memory, in response to a determined match, execution data associated with said matching stored set of iterative data.

4. A data processing system for storing iterative data, said data processing system comprising:

a cache;

memory;

means for executing a first iteration of an iterative processing having a plurality of iterative steps, each one of said plurality of iterative steps generating a set of iterative data including a receiving object type, a message sent, and a method address;

means for storing each one of said sets of iterative data in said cache;

means for identifying each one of said stored sets of iterative data with its corresponding one of said plurality of iterative steps;

means for determining that said first iteration has finished executing by verifying that a user specified maximum number of entries have been stored in said cache;

means for executing a second iteration of said iterative process;

means for comparing, during said second iteration, a new set of iterative data generated from one of said plurality of iterative steps to one of said stored sets of iterative data identified with said one of said plurality of iterative steps to determine if said identified stored set of iterative data matches said generated set of iterative data; and means for retrieving from said memory, in response to a determined match, execution data corresponding to said matching stored set of iterative data.

5. A data processing system for storing iterative data, said data processing system comprising:

a cache;

memory;

means for executing a first iteration of an iterative process having a plurality of iterative steps, each one of said plurality of iterative steps generating a set of iterative data including a receiving object type, a message sent, and a method address;

means for storing each one of said sets of iterative data in said cache;

means for identifying each one of said stored sets of iterative data with its corresponding one of said plurality of iterative steps;

means for executing a second iteration of said iterative process;

means for comparing, during said second iteration, a new set of iterative data generated from the first step of said plurality of iterative steps with said stored set of iterative data identified with said first step of said first iteration; and means for determining that first iteration has finished executing by verifying that said identified stored set of iterative data matches said generated set of iterative data;

means for comparing, during said second iteration, a new set of iterative data generated from one of said plurality of iterative steps to one of said stored sets of iterative data identified with said one of said plurality of iterative steps to determine if said identified stored set of iterative data matches said generated set of iterative data; and means for retrieving from said memory, in response to a determined match, execution data corresponding to said matching stored set of iterative data.

6. A method of storing iterative data in a data processing system having a cache and memory, said method comprising the steps of:

executing a first iteration of an iterative process having a plurality of iterative stages, each one of said plurality of iterative stages generating a set of iterative data including a receiving object type, a message sent, and a method address;

storing each one of said sets of iterative data in said cache;

identifying each one of said stored sets of iterative data with its corresponding one of said plurality of iterative stages;

determining that said first iteration has finished executing when a user specified maximum number of entries have been stored in said cache;

executing a second iteration of said iterative process;

comparing, during said second iteration, a new set of iterative data generated from one of said plurality of operative stages to said stored set of iterative data identified with said one of said plurality of iterative stages to determine if said identified stored set of iterative data matches said generated set of iterative data; and retrieving from said memory, in response to a determined match, execution data corresponding to said matching stored set of iterative data.

* * * * *

UNITED STATES PATENT AND TRADEMARK OFFICE
CERTIFICATE OF CORRECTION

PATENT NO. : 5,519,845
DATED : May 21, 1996
INVENTOR(S) : Rodney Birch and Keith Holmes It is certified that error appears in the above-identified patent and that said Letters Patent is hereby corrected as shown below:

Col. 1,
    line 67, delete "(OOP)" and insert --(OOP)--;

Col. 10, line 14, delete "iterative" and insert --iteration--; and

Col. 12, line 41, delete "operative" and insert --iterative--.

Signed and Sealed this

Twelfth Day of November, 1996

Attest:

BRUCE LEHMAN

Attesting Officer      Commissioner of Patents and Trademarks